UNITED STATES PATENT OFFICE.

SOPHUS FENGER, OF NAKSKOV, DENMARK.

METHOD OF PRESERVING GREASE.

995,240.  Specification of Letters Patent.  Patented June 13, 1911.

No Drawing.   Application filed June 6, 1907.  Serial No. 377,508.

*To all whom it may concern:*

Be it known that I, SOPHUS FENGER, a citizen of the Kingdom of Denmark, and residing in the city of Nakskov, Denmark, have invented a new and useful Method of Preserving Grease; and I do hereby declare the following to be a full, clear, and exact description of the same.

This invention relates to a method of making a mixture of grease, which is exceedingly well adapted for animal food, lubrication and the like, and which does not become rancid even after several months. This method of making the mixture of grease (which mixture consists partially of animal and partially of vegetable grease) is carried out as follows:—The solid animal grease-substances are separately melted at their respective melting points, and treated by stirring with a small quantity of alkali, potassium hydroxid (KOH,) or sodium hydroxid (NaOH) dissolved in a small quantity of water, the mixture being steadily kept at such a temperature that it is liquid. Referring to carrying out this process with specific substances, lard mixed with palmitin, the degree of acid of a sample is first ascertained. If the animal grease is entirely neutral (which very rarely happens), the operator as a first step adds thereto 10 centigr. of the alkali for each kilogr. of grease. Then the whole quantity of grease is melted at a low temperature (for instance, 40° C.), and when the melting is completed, there is added an aqueous solution of one part of potassium hydroxid and two parts of sodium hydroxid, sufficient to neutralize the ascertained free sebacic acid, and, in addition thereto such a quantity of KOH and NaOH that there will be present one-third more thereof than is necessary for neutralization of the ascertained free fatty or aliphatic acids, *i. e.*, acids of the general formula $C_nH_{2n+1}COOH$. The melted mass is slowly stirred and kept at a temperature of (about) 37° C. for about 24 hours whereupon the excess of alkali in the mixture, and which has not yet formed a neutral soap, is neutralized with muriatic acid. There would naturally occur, in this operation, the formation of soap and glycerin, but this action is prevented almost entirely because a small quantity of alkali acting at a temperature at which the mixture of fats is kept fluid, neutralizes the free sebacic acids and the molecules of fat, which have already been attacked, but no time is left for the added small quantity of alkali to act upon the unattacked molecules of fat. The acid degree of the fats is ascertained beforehand and a suitable amount of alkali is added for neutralizing. Any surplus of alkali is neutralized by means of muriatic acid. The vegetable grease substance heated separately at any desired temperature, is added, in sufficient quantity to keep the mixture in a thick honey-like state. As vegetable grease arachis oil is generally used. After partial cooling, there is added a small quantity, (as a rule 1.5–3 %) of sapo-butyraceous (butter soap, a yellowish white and hard soap made of butter and sodium hydroxid), to increase the viscosity of the mass, and then the whole mixture is slowly cooled down to a temperature of about 4–5° C., at which degree it is kept for about 24 hours. The mixture is then ready for use and, when mixed with milk is used as a food for pigs and calves.

The substances obtained by the above mentioned treatment are considerably more lasting than in their original state, and can, as already mentioned, be kept for months without becoming rancid.

I claim:—

1. The method of preserving grease, which consists in treating a solid animal grease, at its melting temperature with an aqueous alkali solution sufficient in quantity to neutralize the free aliphatic acid; adding thereto one-third more of the alkali solution; stirring the mixture while maintaining its temperature for 24 hours at substantially 37° C.; neutralizing the excess of alkali with muriatic acid; adding sufficient melted vegetable grease to maintain the mixture in a honey-like state; partially cooling the mixture and introducing therein about 1.5% to 3% of butter soap; slowly cooling the whole mixture to about 4° C. and maintaining it at that degree for about 24 hours.

2. The method of preserving grease, which consists in treating a solid animal grease, such as lard, at its melting point with an aqueous solution of one part potassium hydroxid and two parts sodium hydroxid in sufficient quantity to neutralize the ascertained free aliphatic acid, and then adding thereto one-third more of the said alkali solution; slowly stirring the melted mass at a temperature of about 37° C., and neutralizing with muriatic acid any excess of alkali in the mixture; combining therewith a separately heated vegetable grease, such as palmitin, adding sufficient of butter-soap to keep the mixture viscous, then cooling down and maintaining the entire mass for about 24 hours at a temperature of about 4° to 5° C.

3. The method of preserving grease, which consists in adding to a solid animal grease substance at its melting point 10 centigrams of alkali for each kilogram of grease, stirring the mixture at about 37° C. for 24 hours, adding muriatic acid sufficient to neutralize any free alkali in the mixture; adding sufficient melted vegetable grease to keep the whole in a thick, honey-like state, combining therewith 1.5% to 3% of butter-soap, and maintaining the whole for 24 hours at a temperature of about 4° to 5° C.

In testimony whereof, I have signed my name to this specification in the presence of two subscribing witnesses.

SOPHUS FENGER.

Witnesses:
H. FLEISCHER,
L. STUB.

---

Copies of this patent may be obtained for five cents each, by addressing the "Commissioner of Patents, Washington, D. C."